United States Patent
Khoshkava et al.

(10) Patent No.: US 11,175,738 B2
(45) Date of Patent: Nov. 16, 2021

(54) SYSTEMS AND METHODS FOR PROXIMITY-BASED HAPTIC FEEDBACK

(71) Applicant: Immersion Corporation, San Jose, CA (US)

(72) Inventors: Vahid Khoshkava, Montreal (CA); Abdelwahab Hamam, Montreal (CA)

(73) Assignee: Immersion Corporation, San Jose, CA (US)

( * ) Notice: Subject to any disclaimer, the term of this patent is extended or adjusted under 35 U.S.C. 154(b) by 698 days.

(21) Appl. No.: 15/377,096

(22) Filed: Dec. 13, 2016

(65) Prior Publication Data

US 2018/0164886 A1 Jun. 14, 2018

(51) Int. Cl.
| | |
|---|---|
| *G06F 3/01* | (2006.01) |
| *G06F 3/042* | (2006.01) |
| *G06F 3/041* | (2006.01) |
| *G06F 3/0488* | (2013.01) |
| *G06F 3/044* | (2006.01) |

(52) U.S. Cl.
CPC ............ *G06F 3/016* (2013.01); *G06F 3/0416* (2013.01); *G06F 3/0421* (2013.01); *G06F 3/0446* (2019.05); *G06F 3/0488* (2013.01); *G06F 2203/04101* (2013.01); *G06F 2203/04108* (2013.01)

(58) Field of Classification Search
CPC ........ G06F 3/016; G06F 3/0416; G06F 3/044; G06F 3/0421; G06F 2203/04108; G06F 3/0412; G06F 3/0414; G06F 2203/04105; G06F 2203/04107; H01L 27/323
See application file for complete search history.

(56) References Cited

U.S. PATENT DOCUMENTS

| | | |
|---|---|---|
| 5,311,175 A | 5/1994 | Waldman |
| 6,715,045 B2 | 3/2004 | Braun et al. |
| 7,890,863 B2 | 2/2011 | Grant et al. |
| 2004/0257339 A1 | 12/2004 | Takahashi |

(Continued)

FOREIGN PATENT DOCUMENTS

| | | |
|---|---|---|
| CN | 102308270 | 1/2012 |
| CN | 103543874 | 1/2014 |

(Continued)

OTHER PUBLICATIONS

EP17206294.5, "Extended European Search Report", dated Apr. 25, 2018, 8 pages.

(Continued)

*Primary Examiner* — Bryan Earles
(74) *Attorney, Agent, or Firm* — Kilpatrick Townsend & Stockton LLP

(57) ABSTRACT

One illustrative device disclosed herein includes a proximity sensor capable of detecting a non-contact interaction with a touch-sensitive device and outputting a first sensor signal. The device also includes a touch sensor for detecting a touch on the touch-sensitive device and outputting a second sensor signal. The disclosed device also includes a processor configured to receive the first and second sensor signals, generate a haptic output signal based at least in part on the first and second sensor signals, transmit the haptic output signal to a haptic output device. The haptic output device in the disclosed device then outputs the haptic effect.

19 Claims, 6 Drawing Sheets

(56) References Cited

U.S. PATENT DOCUMENTS

| | | |
|---|---|---|
| 2006/0152497 A1 | 7/2006 | Rekimoto |
| 2006/0274050 A1 | 12/2006 | Lii |
| 2007/0070044 A1 | 3/2007 | Yeh et al. |
| 2008/0238886 A1 | 10/2008 | Bengtsson et al. |
| 2009/0140996 A1 | 6/2009 | Takashima et al. |
| 2009/0322497 A1* | 12/2009 | Ku ................ G06F 1/1624 340/407.2 |
| 2010/0004033 A1* | 1/2010 | Choe ............... G06F 1/1626 455/567 |
| 2010/0079264 A1 | 4/2010 | Hoellwarth |
| 2011/0138277 A1 | 6/2011 | Grant et al. |
| 2011/0164063 A1 | 7/2011 | Shimotani et al. |
| 2012/0056825 A1 | 3/2012 | Ramsey et al. |
| 2013/0249859 A1 | 9/2013 | Park et al. |
| 2015/0293592 A1* | 10/2015 | Cheong ............ G06F 3/016 345/173 |
| 2017/0090576 A1* | 3/2017 | Peterson .......... G06F 3/016 |
| 2017/0285848 A1* | 10/2017 | Rosenberg ....... G06F 3/0416 |
| 2017/0300166 A1* | 10/2017 | Rosenberg ....... G06F 3/045 |

FOREIGN PATENT DOCUMENTS

| | | |
|---|---|---|
| CN | 105388966 | 3/2016 |
| CN | 105556423 | 5/2016 |
| CN | 105900045 | 8/2016 |
| CN | 205680056 | 11/2016 |
| EP | 2 141 580 A2 | 1/2010 |
| EP | 2 209 060 A2 | 7/2010 |
| EP | 2 887 187 A1 | 6/2015 |
| JP | H00643998 B2 | 2/1994 |
| JP | 2008123431 A | 5/2008 |
| JP | 2011150964 | 8/2011 |
| KR | 20100002776 A | 1/2010 |
| WO | 2008042745 A2 | 4/2008 |

OTHER PUBLICATIONS

CN. Application No. CN201711322141.5, Office Action, dated Sep. 15, 2021, 12 pages.

* cited by examiner

SYSTEMS AND METHODS FOR PROXIMITY-BASED HAPTIC FEEDBACK

FIELD OF INVENTION

The present disclosure relates generally to user interface devices. More specifically, but not by way of limitation, this disclosure relates to systems and methods for proximity-based haptic feedback.

BACKGROUND

Many modern devices include a touch-sensitive input device that can be used by a user to interact with a device. However, such devices may be difficult or confusing to operate. Further, in some cases, such devices may be used in situations in which the user is unable or unwilling to look at the device during use. Such devices may benefit from the presence of haptic feedback

SUMMARY

Various embodiments of the present disclosure provide systems and methods for proximity-based haptic feedback.

In one embodiment, a device of the present disclosure may comprise a proximity sensor capable of detecting a non-contact interaction with a touch-sensitive device and outputting a first sensor signal. The device further comprises a touch sensor capable of detecting a touch and outputting a second sensor signal. One such device also comprises a processor configured to receive the first and second sensor signals, generate a haptic output signal based at least in part on the first and second sensor signals, and transmit the haptic output signal to a haptic output device, which then outputs the haptic effect.

In another embodiment, a method of the present disclosure may comprise detecting by a proximity sensor, a non-contact interaction with a touch-sensitive device and transmitting a first sensor signal associated with the non-contact interaction to a processor. The method further comprises detecting by a touch sensor a touch on the touch-sensitive surface and transmitting a second sensor signal associated with the touch to a processor. The method may further comprise receiving, by the processor, the first and second sensor signals, generating, by the processor, a haptic output signal based at least in part on the first and second sensor signals and transmitting, by the processor, the haptic output signal to a haptic output device. The method may further comprise outputting, by the haptic output device, a haptic effect in response to the haptic output signal. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
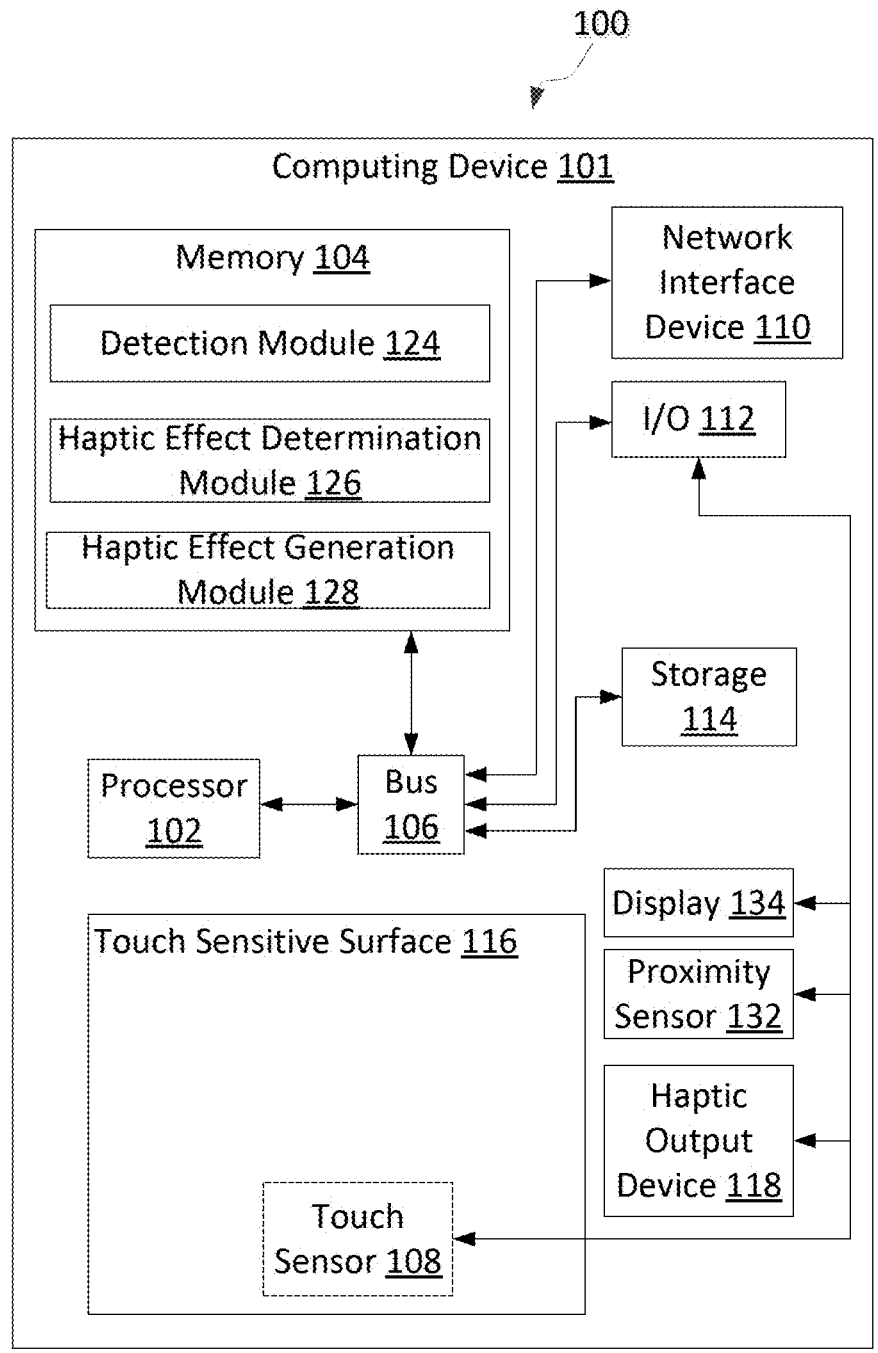
FIG. 1 is a block diagram showing a system for proximity-based haptic feedback according to one embodiment.

Reference now will be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Proximity-Based Haptic Feedback

One illustrative embodiment of the present disclosure comprises a computing device, such as a smartphone or a smartwatch. The computing device comprises a sensor, a memory, a haptic output device, and a processor in communication with each of these elements.

In the illustrative embodiment, the sensor may comprise a dual-mode sensor. Such as sensor is capable of detecting a user's finger in proximity to but not in contact with a touch-sensitive surface and also of detecting when the user's finger is in contact with the touch-sensitive surface. The sensor is also able to detect the approximate location of the finger with respect to the touch-sensitive surface in either contact or non-contact modes. One such sensor utilizes capacitance for sensing.

In the illustrative embodiment, the sensor detects changes in capacitance as a finger or other object approaches the sensor. For example, the user's skin is an insulator, and the fluid behind the skin is a conductive layer. As the user's finger approaches the sensor, the capacitance of the sensor changes near a particular point on the touch-sensitive surface. The change in capacitance may occur before the user's finger makes contact with the surface. Thus, the sensor may be able to detect the user's finger or other objects when they are near, but not yet contacting, the surface.

In response to detecting the presence of the user's finger, the sensor generates and sends a sensor signal to the processor of the device. The sensor signal includes three-dimensional information associated with the position of the user's finger. For example, the information associated with the position of the user's finger may include data that reflects the distance of the finger from the surface of the touch-sensitive device and/or the pressure the finger is exerting on the touch-sensitive service (e.g., the Z component of the finger's location). The information may also include data that reflects the position of the finger in contact with the surface or if the finger is not in contact, then the location of the finger were it in contact with the surface (e.g., the X and Y components of the finger's location).

The processor receives the sensor signal and determines the position of the finger. In the illustrative embodiment, the processor may also determine, for example, the position of an element of the user interface displayed on the touch sensitive interface. Given the two pieces of information, the processor can then determine in which direction the finger should move in order to make contact with the user interface element.

In the illustrative embodiment, once the processor has determined in which way the finger should move, the processor generates an appropriate haptic effect to provide the information to the user. For example, the magnitude and frequency of the effect may be used to convey a direction. The processor may then transmit the haptic output signal to a haptic output device. The haptic output device receives the signal and based on the signal outputs the haptic effect to the user. In one such embodiment, the capacitive sensor also functions as a haptic output device.

The illustrative embodiment may be used for any number of applications. For instance, the user may be operating an automobile and wish to interact with the radio by, for instance, muting the radio without taking her eyes off the road. The radio may include the illustrative touch-sensitive interface and sensor described herein. As the user's finger approaches the mute button on the radio control displayed on the surface, the sensor detects the user's finger. The processor determines where on the surface the finger is approaching and also determines where on the surface the mute button is displayed. The processor then determines in which direction the finger must travel to interact with the button. The processor generates the appropriate haptic output signal and transmits it to the sensor, which in this embodiment, also functions as the haptic output device. The sensor outputs the haptic signal to the user, and she is able to move her finger so that it contacts the surface at the location of the button.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Illustrative Systems for Haptic Feedback for Opportunistic Displays

FIG. 1 is a block diagram showing a system 100 for haptic feedback displays according to one embodiment. In the embodiment depicted in FIG. 1, the system 100 comprises a computing device 101. While the system 100 shown in FIG. 1 comprises a single, integrated computing device 101 in this embodiment. In other embodiments, the system 100 may comprise multiple separate devices in communication with one another.

The computing device 101 shown in FIG. 1 includes a processor 102 in communication with other hardware elements via a bus 106. The computing device 101 may comprise, for example, a mobile device (e.g., a smartphone), tablet, e-reader, smartwatch, a head-mounted display, glasses, a wearable device, an automotive dashboard, a touch-sensitive screen on an appliance, or any other suitable device.

The embodiment shown in FIG. 1 also includes a memory 104. Memory 104 can comprise any suitable tangible (and non-transitory) computer-readable medium such as RAM, ROM, EEPROM, or the like, and embodies program components that configure operation of the computing device 101. In the embodiment shown, computing device 101 further includes one or more network interface devices 110, input/output (I/O) interface components 112, and storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 134, game controllers, keyboards, mice, joysticks, cameras, buttons, speakers, microphones and/or other hardware used to input or output data. Storage 114 represents nonvolatile storage such as solid state, magnetic, optical, or other storage media included in computing device 101 or coupled to the processor 102.

The computing device 101 also includes or is in communication with a touch sensitive surface 116. Touch sensitive surface 116 represents any surface that is configured to sense tactile input of a user. One or more touch sensors 108 are configured to detect a touch in a touch area (e.g., when an object contacts the touch sensitive surface 116) and transmit signals associated with the touch to the processor 102.

The touch sensor 108 can additionally or alternatively comprise other types of sensors. For example, optical sensors with a view of the touch sensitive surface 116 may be used to determine the touch position. As another example, the touch sensor 108 may comprise a LED (Light Emitting Diode) finger detector mounted on the side of a display. In some embodiments, touch sensor 108 may be configured to detect multiple aspects of the user interaction. For example, touch sensor 108 may detect the speed, pressure, and direction of a user interaction, and incorporate this information into the signal transmitted to the processor 102.

In another embodiment, the sensor comprises conductive nanoparticles in a coil shape inside a semi-flexible insulator. The coil shape allows for more flexibility, stretchability and self-inductance characteristic of the nanoparticles. Examples of such materials include coiled carbon nanotubes, nano-metals (copper, silver, etc.) or conductive polymers (conjugated polymers) insude an insulator material. As a user interacts in a non-contact mode with such a sensor, the mutual inductance and/or capacitance between the user's finger and the fabricated sensor varies.

In some embodiments, the computing device 101 comprises a touch-enabled display that combines a touch sensitive surface 116 and a display 134 of the computing device 101. The touch sensitive surface 116 may correspond to the display 134 exterior or one or more layers of material above components of the display 134. In other embodiments, the computing device 101 comprises a touch sensitive surface 116, which may be mapped to a graphical user interface provided in the display 134 that is included in the system 11 interfaced to computing device 101.

In some embodiments, the computing device 101 comprises one or more proximity sensors 132. In some embodiments, the sensor 132 may comprise a capacitance based sensor. For instance, in one such embodiment, the sensor 132 comprises a smart material. In other embodiments, the proximity sensor may comprise an optical sensor, wherein the scattering or reflection of light is the basis for detecting a user's finger. Such an embodiment may have a longer range of detection. Such sensors may comprise, for example, infra-red, laser and other sources of light. Such sensors may comprise a photo-resistor based system in which the user's finger blocks light when approaching the surface such that the system can detect the user's finger.

In some embodiments, the processor 102 may be in communication with a single sensor 132 and, in other embodiments, the processor 102 may be in communication with a plurality of sensors 132. The sensor 132 is configured to transmit sensor signals to the processor 102.

In the embodiment shown in FIG. 1, the system 100 further includes haptic output device 118 in communication with the processor 102. Haptic output device 118 is configured to output a haptic effect in response to a haptic signal. For example, the haptic output device 118 can output a haptic effect in response to a haptic signal from the processor 102. In some embodiments, haptic output device 118 is configured to output a haptic effect comprising, for example, a vibration, a squeeze, a poke, a change in a perceived coefficient of friction, a simulated texture, a stroking sensation, an electro-tactile effect a surface deformation (e.g., a deformation of a surface associated with the computing device 101), an ultrasonic or laser-based effect, and/or a puff of a solid, liquid, or gas. Further, some haptic effects may use multiple haptic output devices 118 of the same or different types in sequence and/or in concert. Although a single haptic output device 118 is shown in FIG. 1, some embodiments may use multiple haptic output devices 118 of the same or different type to produce haptic effects.

In some embodiments, the haptic output device 118 is in communication with the processor 102 and internal to the computing device 101. In other embodiments, the haptic output device 118 is external to the computing device 101 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 118 may be associated with (e.g., coupled to) a wearable device (e.g., a wristband, bracelet, hat, headband, etc.) and configured to receive haptic signals from the processor 102.

In some embodiments, the haptic output device 118 is configured to output a haptic effect comprising a vibration. The haptic output device 118 may comprise, for example, one or more of a piezoelectric actuator, an electro-magnetic actuator, such as an electric motor, an eccentric rotating mass motor (ERM), a voice coil, a solenoid, a shape memory alloy or polymer, a thermal based actuator, a laser, an electro-adhesion actuator, a parallel plate actuator, a microfluidic system, an electro-active polymer, or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, increasing or reducing the perceived coefficient of friction of the surface associated with the haptic output device 118. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101 (e.g., the touch sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger or other body part, or a stylus) near or touching the touch sensitive surface 116. Varying the levels of attraction between the object and the conducting layer can vary the haptic effect perceived by a user.

In some embodiments, the haptic output device 118 comprises a deformation device configured to output a deformation haptic effect. The deformation haptic effect may comprise raising or lowering portions of a surface associated with the computing device 101. For example, the deformation haptic effect may comprise raising portions of the touch sensitive surface 116. In some embodiments, the deformation haptic effect may comprise bending, folding, rolling, twisting, squeezing, flexing, changing the shape of, or otherwise deforming a surface associated with the computing device 101. For example, the deformation haptic effect may apply a force on the computing device 101 or a surface associated with the computing device 101 (e.g., the touch sensitive surface 116), causing it to bend, fold, roll, twist, squeeze, flex, change shape, or otherwise deform.

In some embodiments, the haptic output device 118 comprises fluid configured for outputting a deformation haptic effect (e.g., for bending or deforming a surface associated with the computing device 101). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 (e.g., the touch sensitive surface 116) against deformation. In some embodiments, one or more wires may be embedded in or coupled to the smart gel. As current runs through the wires, heat is emitted, causing the smart gel to expand or contract, which may cause the computing device 101 or a surface associated with the computing device 101 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 101 or a surface associated with the computing device 101 to deform.

In other embodiments utilizing a deformation-based haptic effect, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device 101 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101. For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, shape memory alloys or polymers or smart gels). In some embodiments, the haptic output device 118 is deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

While in the embodiment shown in FIG. 1, the proximity sensor 132 and touch sensor 108 are shown as separate elements, in some embodiments, they may be combined into a single component for the computing device 101. For example, in some embodiments, the touch sensor 108 comprises a dual proximity and touch sensor for sensing both a contact and non-contact interaction with the touch-sensitive surface. In yet another embodiment, the touch-sensor 108, proximity sensor 132, and haptic output device 118 are combined in a single component capable of detecting contact and non-contact interactions with the device and providing haptic effects to the user both during contact and non-contact interactions.

Turning to memory 104, modules 124, 126, and 128 are depicted to show how a device can be configured in some embodiments to provide haptic feedback. In this example, a detection module 124 configures the processor 102 to monitor the touch sensitive surface 116 via the touch sensor 108 to determine a position of a touch. For example, the detection module 124 may sample the touch sensor 108 in order to track the presence or absence of an object, such as a user's finger and, if an object is present, to track one or more of the location, path, velocity, acceleration, pressure and/or other characteristics of the object over time.

In some embodiments, the haptic effect determination module 126 represents a program component that analyzes data to determine a haptic effect to generate. The haptic effect determination module 126 may comprise code that selects one or more haptic effects to output using one or more algorithms or lookup tables. In some embodiments, the haptic effect determination module 126 comprises one or more algorithms or lookup tables usable by the processor 102 to determine a haptic effect.

Particularly, in some embodiments, the haptic effect determination module 126 may determine a haptic effect based at least in part on sensor signals received from the touch sensor 108 and/or proximity sensor 132. For example, the processor 102 may receive sensor signals from the proximity sensor 132 and determine that a user's finger is near the touch sensitive surface 116. The haptic effect determination module 126 may then determine a haptic effect based at least in part on the sensor signal from the proximity sensor. For example, in one such embodiment, the haptic effect determination module 126 may determine a first haptic effect that is output to a user associated with the computing device 101 to indicate to the user that the user should move a finger in a certain way as it approaches the touch-sensitive surface 116.

In some embodiments, the computing device 101 may include one or more haptic output devices 118 for providing various output effects associated with the proximity and location relative to the touch-sensitive surface 116 of the computing device 101. In some embodiments, the haptic effect determination module 126 may comprise code that determines, based on a location of a finger in proximity to or a based on a touch on the touch sensitive surface 116, a haptic effect to output and code that selects one or more haptic effects to provide in order to simulate the effect. For example, different haptic effects may be selected based on the location of a touch in order to simulate the presence of a virtual object (e.g., a virtual button, dial, or lever.) on the display 134.

In some embodiments, the haptic effect determination module 126 comprises code that determines a haptic effect based on an event. An event, as used herein, is any interaction, action, collision, or other event which occurs during operation of the computing device 101, which can potentially comprise an associated haptic effect. For example, in some embodiments, an event may comprise user input (e.g., a button press, manipulating a joystick, or otherwise interacting with a touch sensitive surface 116), a system status (e.g., low battery, low memory, or a system notification, such as a notification generated based on the system receiving a message, an incoming phone call, a notification, or an update), sending data, receiving data, or a program event (e.g., if the program is a game, a program event may comprise explosions, gunshots, collisions, interactions between game characters, advancing to a new level, or driving over bumpy terrain).

In some embodiments, the haptic effect generation module 128 represents programming that causes the processor 102 to generate and transmit haptic signals to the haptic output device 118 to generate the selected haptic effect. In some examples, the haptic effect generation module 128 causes the haptic output device 118 to generate a haptic effect determined by the haptic effect determination module 126. For example, the haptic effect generation module 128 may access stored waveforms or commands to send to the haptic output device 118 to create the selected haptic effect. In some embodiments, the haptic effect generation module 128 may comprise algorithms to determine the haptic signal. The haptic effect generation module 128 may comprise algorithms to determine target coordinates for the haptic effect (e.g., coordinates for a location on the computing device 101, such as on the touch sensitive surface 116, at which to output the haptic effect).

Illustrative Dual Proximity and Pressure Sensor Embodiment

Figure 2A:
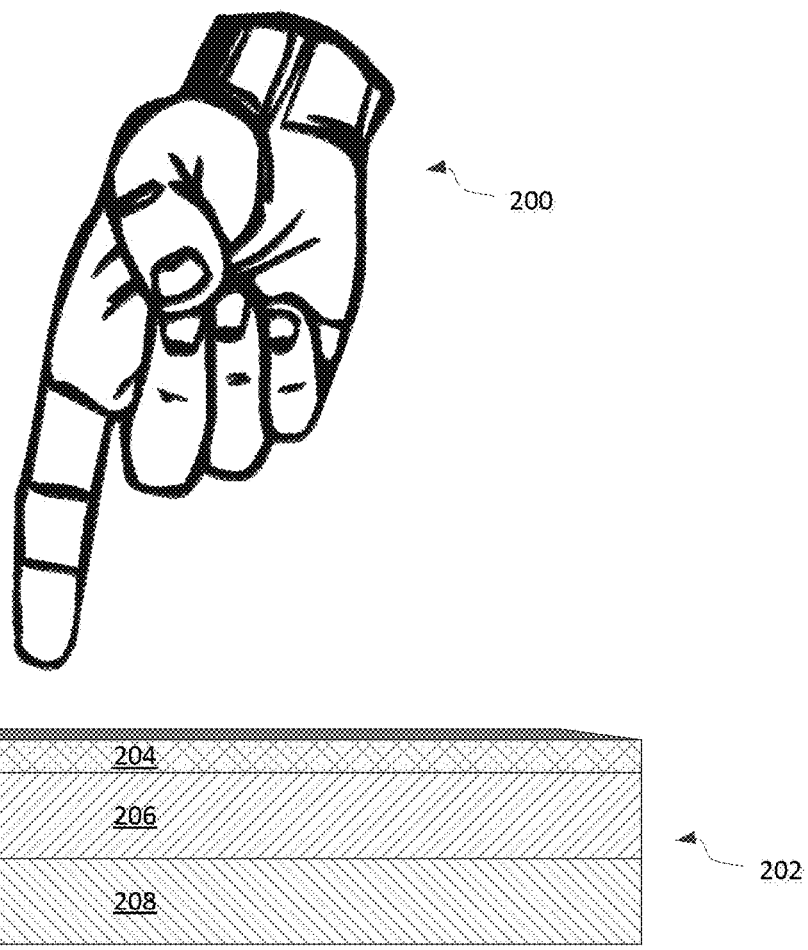
FIGS. 2A and 2B show an embodiment of a dual proximity sensor and haptic actuator device according to one embodiment.
Figure 2B:
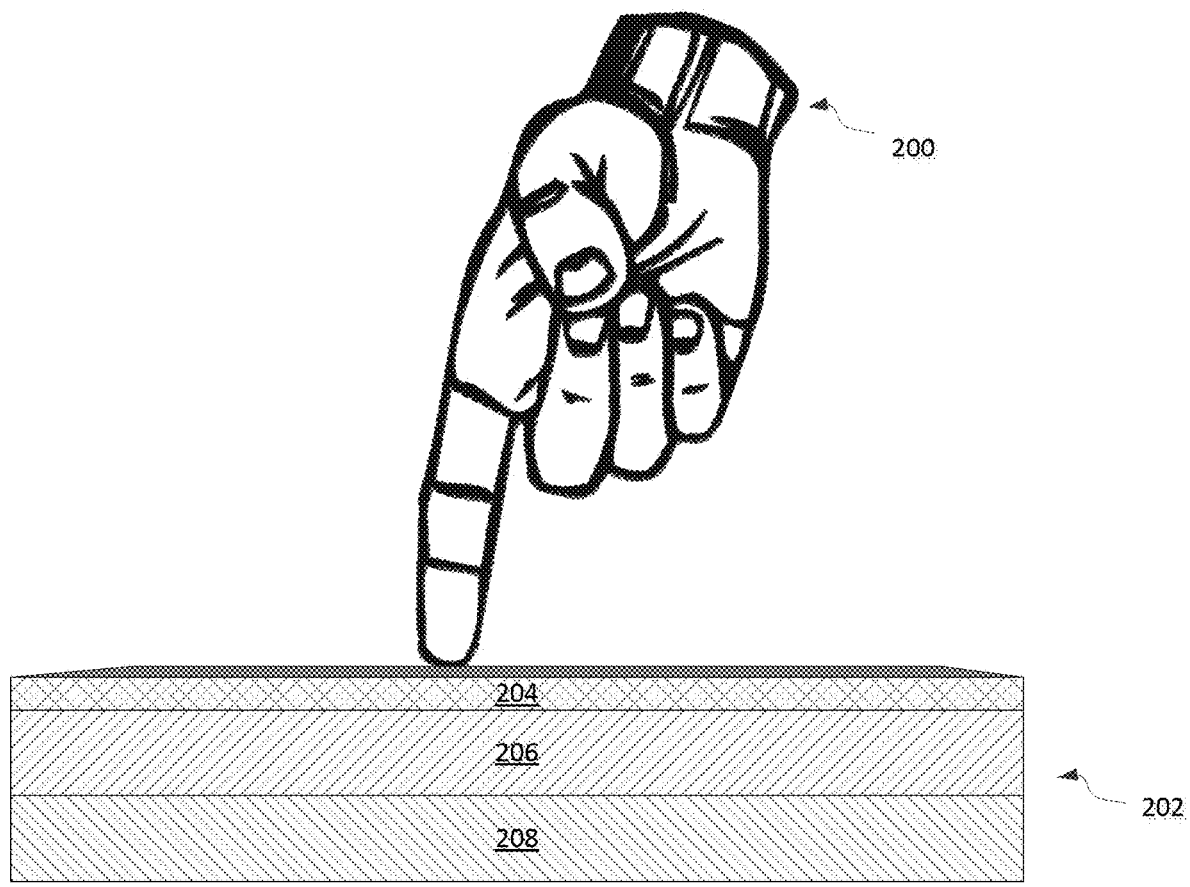

FIGS. 2A and 2B are drawings of a dual proximity and pressure sensor according to one embodiment of the present disclosure. In the figures shown, the non-contact capacitive and contact pressure based sensor are integrated into a smart material haptic actuator 202. Such a sensor/actuator combination may be referred to herein as an integrated sensor.

In the embodiment shown in FIG. 2A, the user's hand 200, and in particular, the user's finger is approaching the surface of the actuator 202. The actuator 202 includes three layers. The first layer is a thin insulator 204.

In the embodiment shown in FIGS. 2A and 2B, the second layer 204 is an electro-active polymer (EAP), such as PVDF, piezoelectric, or dielectric elastomer. On one side of that layer is applied a uniform electrode pattern. Applying a pattern on one side allows for creating location haptic actuation. In other embodiments, both sides of the EAP may have such an array of electrodes applied. However, in the embodiment shown, on the other side of the electro-active polymer network arrays of electrodes are applied. Thus, as illustrated, the second layer 206 comprises an electro-active polymer with one side having a uniform electrode pattern and the other side a network pattern.

The third layer 208 is an elastomer (e.g., rubber) layer placed under the surface of the second layer 206 that has the network array of electrodes applied. Finally, network arrays of electrodes are placed on the side of the third layer 208 opposite the second layer 206 to complete the sensor. The soft material acts as an insulator for the capacitance where the electrodes are dispersed in a pattern. In that way, the electrode can be used to activate a smart material actuator.

Such an embodiment provides a contact and non-contact mode. In a non-contact mode, the user finger 200 adds another capacitance to the system (in series), and therefore the sensor/actuator can recognize the finger based on the change in total capacitance.

In such an embodiment, the user also can press (contact mode) as shown in FIG. 2B and therefore, compress the insulator material 208 (elastomer layer) and therefore the capacitance changes and the sensor is able to measure the pressure level (the more pressure, the lower thickness of the insulator material).

Various modifications and alternatives to the embodiment described in relation to FIG. 2 are possible. For instance, in some embodiments, the same type of material can serve as the actuator and the sensor. For example, in some embodiments, the elastomer (e.g., rubber) can act as both the sensor and the actuator. The EAP may comprise, for example, a dielectric elastomer (DEA), PVDF or any other material that exhibits a piezoelectric response, or an electrostrictive material. In some embodiments, the EAP can act as both the sensor and the actuator. In some such embodiments, such as when used in combination with a display, the various layers are configured to be transparent so that the display can be viewed through the sensor/actuator.

The top layer 202 in the embodiment shown is an insulator to avoid potentially shocking the user of the device when the user contacts the surface. In other embodiments, the top layer can be eliminated, but the electrode of the second layer 206 in contact with the user is then grounded.

The dual proximity sensor and haptic actuator shown in FIGS. 2A and 2B can be used to provide a variety of haptic effects. For example, the actuator 202 may be used to provide a static electrostatic friction sensation. While the dual proximity sensor and haptic actuator shown in FIGS. 2A and 2B is illustrated as single device, comprising three layers, the sensor/actuator may be constructed in any number of ways. For example, the device 200 could be implemented as a plurality of the devices 202 illustrated in FIGS. 2A and 2B which are arranged to form a surface, such as by arranging sixteen devices 202 as a four-by-four grid of sensor/actuator devices 202.

Figure 3:
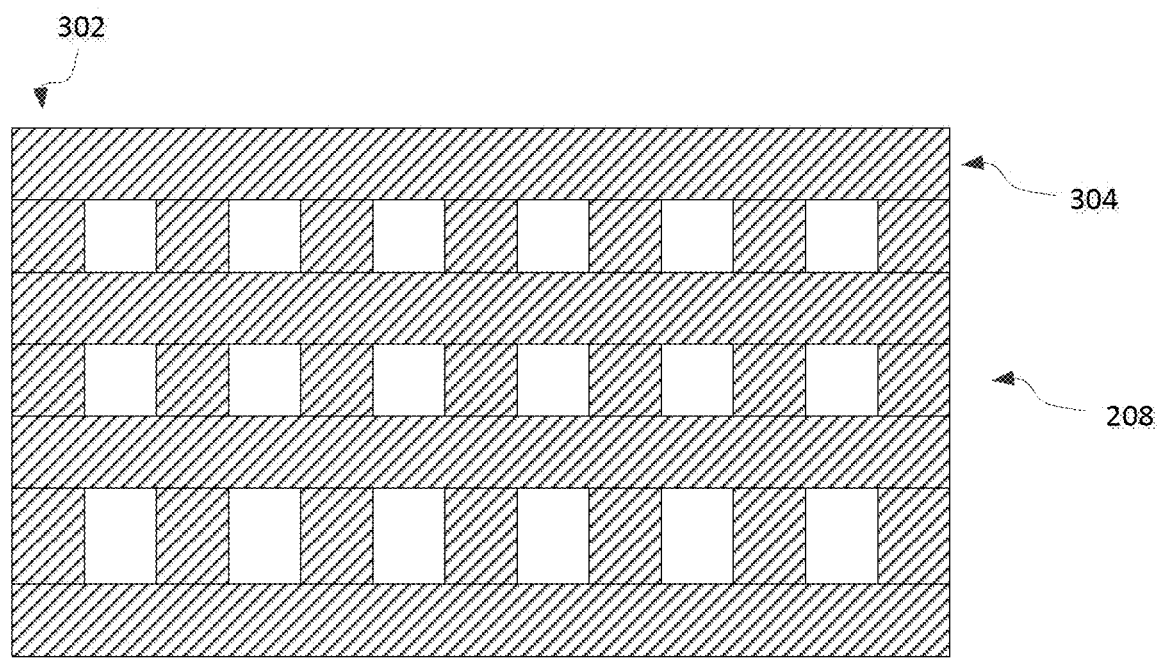
FIG. 3 show an embodiment of a dual proximity sensor and haptic actuator device according to another embodiment.

FIG. 3 show one embodiment of a dual proximity sensor and haptic actuator device according to an embodiment. In the embodiment shown in FIG. 3, one surface of the bottom layer 208 is shown. In the embodiment shown, the electrodes are arranged as a network array that includes seven columns 302 and four rows 304. Other embodiments can include any suitable number of electrodes arranged in any suitable manner.

Illustrative Methods for Providing Haptic Feedback

Figure 4:
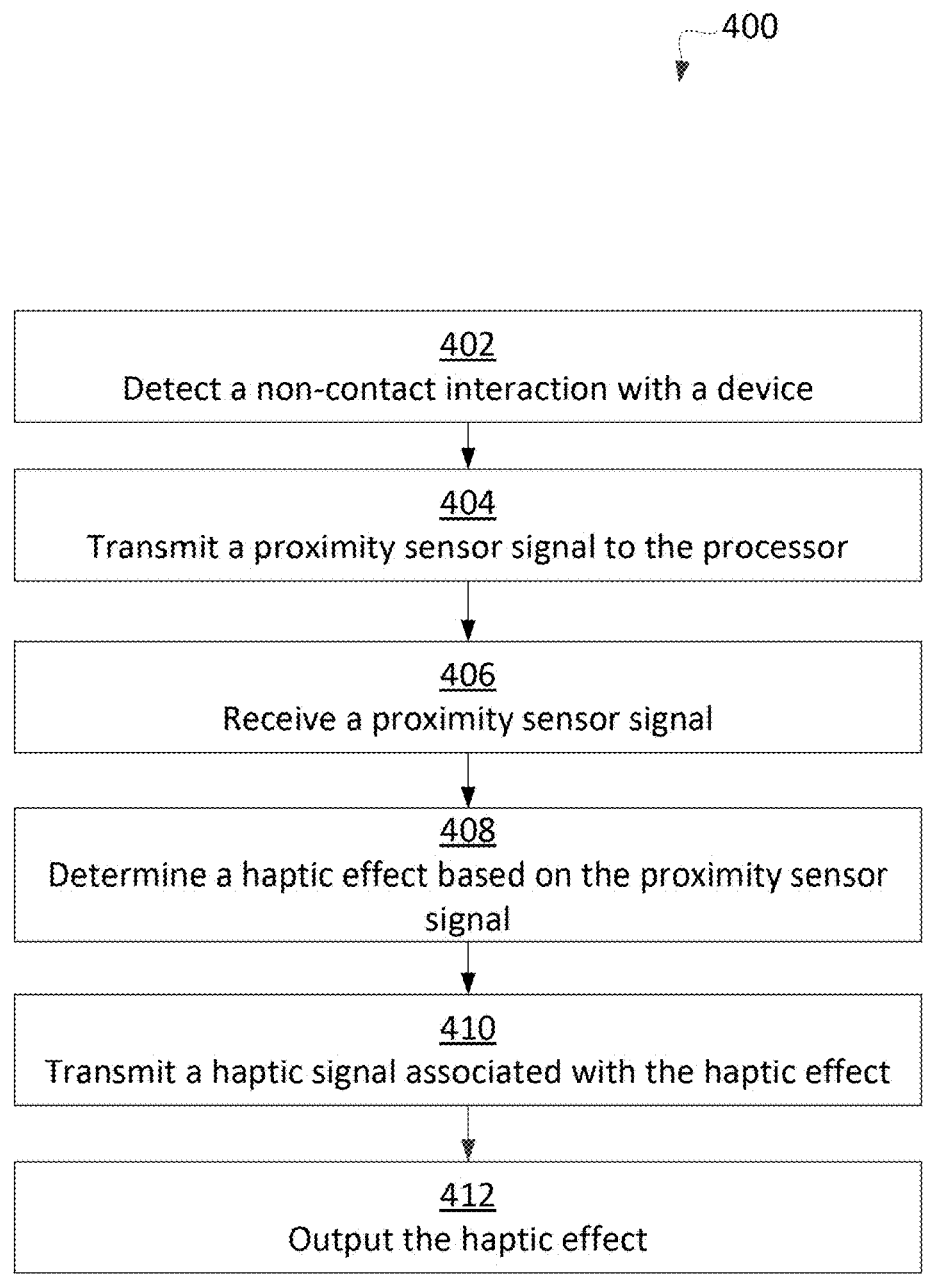
FIG. 4 is a flow chart of steps for performing a method for providing proximity-based haptic feedback.

FIG. 4 is a flow chart of steps for performing a method 400 for providing haptic feedback for opportunistic displays according to one embodiment. In some embodiments, the steps in FIG. 4 may be implemented in program code that is executable by a processor, for example, the processor in a general purpose computer, a mobile device, or a server. In some embodiments, these steps may be implemented by a group of processors. In some embodiments, one or more steps shown in FIG. 4 may be omitted or performed in a different order. Similarly, in some embodiments, additional steps not shown in FIG. 4 may also be performed. The steps below are described with reference to components described above with regard to the devices shown in FIG. 1.

The method 400 begins at step 402 when the proximity sensor 132 of the computing device 101 detects a user's finger in proximity to a touch-sensitive surface 116. For instance, the proximity sensor 132 may be a capacitance sensor that senses a change in capacitance as the user's finger approaches the sensor. The proximity sensor 132 next transmits a proximity sensor signal to the processor 102.

The method continues at step 404 where the proximity sensor transmits a proximity sensor signal to the processor 102 and then at step 406 when the processor 102 receives the proximity sensor signal. The method 400 continues at step 408 when the processor 102 determines a haptic effect based at least in part on the proximity sensor signal. For instance, the processor 102 may be configured to direct the user's interactions with a user interface element displayed on the touch sensitive surface 116. Thus the processor 102 determines a haptic effect that will cause the user to move her finger in the appropriate direction. In some embodiments, the haptic effect can include one or more haptic effects. For example, the haptic effect can include a haptic effect based on direction to the user interface element and a haptic effect based on the distance from the user's finger to the control, e.g., a larger magnitude and frequency corresponding to a further distance and a direction towards the top of the touch sensitive surface.

The method continues at step 410 when the processor 102 transmits a haptic signal associated with the haptic effect to the haptic output device 118. In some embodiments, the processor 102 may transmit one or more haptic signals to the haptic output device 118. In some embodiments, the haptic effect generation module 128 causes the processor 102 to generate and transmit the haptic signal to the haptic output device 118.

The method 400 continues at step 412 when haptic output device 118 outputs the haptic effect. In some embodiments, the haptic effect comprises a vibration, a surface deformation, a squeeze, a poke, and/or a puff of a solid, liquid, gas, or plasma. In other embodiments, the haptic effect may comprise a change to the coefficient of friction of the device. In yet another embodiment, the haptic effect may comprise a vibration.

Figure 5:
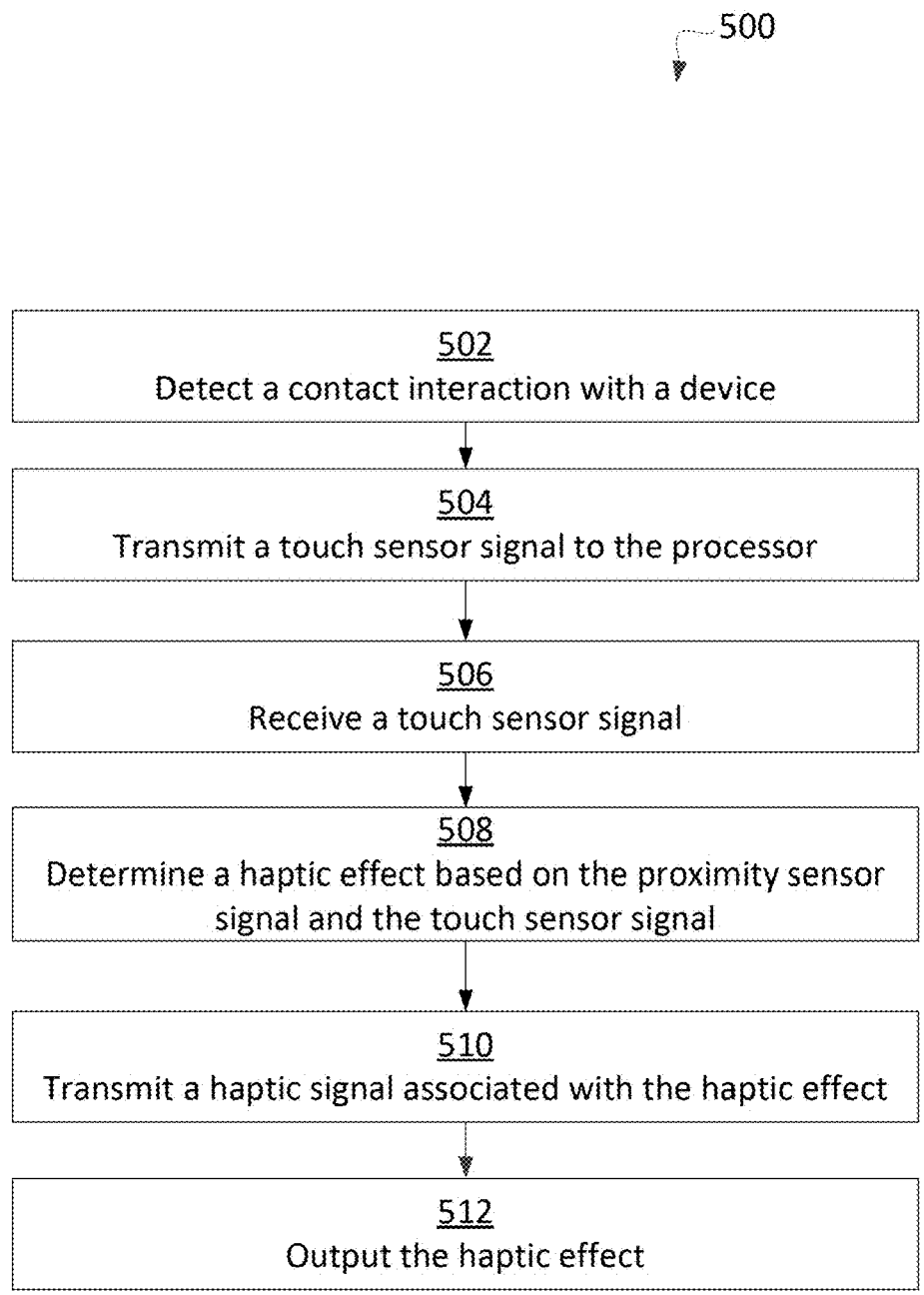
FIG. 5 is a flow chart of steps for performing another method for providing proximity-based haptic feedback.

FIG. 5 is a flow chart of steps for performing another method for providing proximity-based haptic feedback. Like the method illustrated in FIG. 4, in some embodiments, the steps in FIG. 5 may be implemented in program code that is executable by a processor, for example, the processor in a general purpose computer, a mobile device, or a server. In some embodiments, these steps may be implemented by a group of processors. In some embodiments, one or more steps shown in FIG. 5 may be omitted or performed in a different order. Similarly, in some embodiments, additional steps not shown in FIG. 5 may also be performed. The steps below are described with reference to components described above with regard to the devices shown in FIG. 1.

The method 500 begins at step 502 when the touch sensor 108 of the computing device 101 detects a user's finger contacting a touch-sensitive surface 116. For instance, the touch sensor 108 may be a capacitance sensor that senses a change in capacitance as the user's finger touches the sensor 108. The touch sensor 108 may be integrated with the proximity sensor 132 and/or with the haptic output device 118. The touch sensor 108 next transmits a touch sensor signal to the processor 102.

The method continues at step 504, where the touch sensor 108 generates a signal and transmits the signal to the processor 102. At step 506 the processor 102 receives the touch sensor signal. The method 500 continues at step 508 when the processor 102 determines a haptic effect based at least in part on the touch sensor signal and on the proximity signal. For instance, the processor 102 may be configured to output a particular haptic effect associated with a particular control on a user interface element displayed on the touch sensitive surface 116. Such a haptic effect may further be modified or combined with another haptic effect based on the proximity sensor signal. In some embodiments, the haptic effect can include one or more haptic effects. For example, the haptic effect can include a haptic effect meant to confirm "pushing" on a virtual button.

The method continues at step 510 when the processor 102 transmits a haptic signal associated with the haptic effect to the haptic output device 118. In some embodiments, the processor 102 may transmit one or more haptic signals to the haptic output device 118. In some embodiments, the haptic effect generation module 128 causes the processor 102 to generate and transmit the haptic signal to the haptic output device 118.

The method 500 continues at step 512 when haptic output device 118 outputs the haptic effect based on the availability and location of the display device 136. In some embodiments, the haptic effect comprises a vibration, a surface deformation, a squeeze, a poke, and/or a puff of a solid, liquid, gas, or plasma. In other embodiments, the haptic effect may comprise a change to the coefficient of friction of the device. In yet another embodiment, the haptic effect may comprise a vibration.

Advantages of Proximity-Based Haptic Feedback

Embodiments of the present disclosure provide advantages in a variety of implementations. For example, as described above, an embodiment implemented in conjunction with a user interface in an automobile or any vehicle or equipment in which the user may wish to interact with a user interface while maintaining focus outside the vehicle provides the benefit of allowing the operator to focus on the road or any outside element while interacting with the user interface. For instance, a heavy equipment operator could continue to watch an implement on the equipment while simultaneously interacting with a user interface on the vehicle. Embodiments of the present disclosure may also be advantageous in small screen devices. For example, a watch incorporating proximity-based haptic feedback may allow the user to more accurately choose controls on the small screen.

Other embodiments may be advantageous when implemented in mobile devices, such as phones. Such an implementation may allow a user to navigate the user interface without looking at the screen. For instance, if a user were running and holding a phone in the user's hand, the user may be able to navigate the user interface without looking at the screen. Another similar embodiment would include a game controller. With such an embodiment, the user is able to focus on the screen while simultaneously interacting with a user interface, without the need to look extensively at the user interface display on the game controller.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A device comprising:
    a proximity sensor capable of detecting a non-contact interaction with a touch-sensitive device and outputting a first sensor signal;
    a touch sensor capable of detecting a touch with the touch-sensitive input device and outputting a second sensor signal;
    a haptic output device configured to receive a haptic output signal and output a haptic effect in response to the haptic output signal; and
    a processor configured to:
        receive the first sensor signal and the second sensor signal;
        generate a haptic output signal based at least in part on the first and second sensor signals; and
        transmit the haptic output signal to the haptic output device.

2. The device of claim 1, wherein the proximity sensor is integrated into the touch-sensitive device.

3. The device of claim 1, wherein the proximity sensor comprises one of a capacitive sensor or an optical sensor.

4. The device of claim 1, wherein the haptic output signal is designed to direct a user to contact the touch-sensitive device at a particular location.

5. The device of claim 1, wherein an integrated sensor comprises the proximity sensor and the touch sensor.

6. The device of claim 5, wherein the integrated sensor further comprises the haptic output device.

7. The device of claim 5, wherein the integrated sensor comprises an electro-active polymer.

8. The device of claim 7, wherein the electro-active polymer comprises a first side with a uniform electrode pattern layer affixed thereto and a second side with a network electrode pattern layer affixed thereto.

9. The device of claim 8, further comprising an elastomer layer having a first side with a second network electrode pattern layer affixed thereto and a second side configured adjacent to the second side of the electro-active polymer.

10. The device of claim 9, further comprising an insulator layer adjacent to the first side of the electro active polymer.

11. The device of claim 3, wherein the optical sensor comprises one of a laser, an infra-red emitter, or a photoresistor.

12. The device of claim 1, wherein the haptic output device comprises an electrostatic friction actuator.

13. The device of claim 1, wherein the haptic output device comprises an air puff actuator.

14. The device of claim 1, wherein the touch sensor is capable of detecting a pressure and wherein the haptic output signal is based at least in part on the detected pressure.

15. A method comprising:
    detecting, by a proximity sensor, a non-contact interaction with a touch-sensitive device;
    detecting, by a touch sensor, a touch on the touch-sensitive device;
    transmitting a first sensor signal associated with the non-contact interaction to a processor;
    transmitting a second sensor signal associated with the touch to a processor;
    receiving, by the processor, the first and second sensor signals;

generating, by the processor, a haptic output signal based at least in part on the first and second sensor signals;

transmitting, by the processor, the haptic output signal to a haptic output device; and outputting, by the haptic output device, a haptic effect in response to the haptic output signal.

16. The method of claim 15, wherein the haptic output signal is designed to direct a user to contact the touch-sensitive device at a particular location.

17. The method of claim 15, wherein outputting a haptic effect comprises outputting, by an electrostatic friction actuator, an electrostatic friction haptic effect.

18. The method of claim 15, wherein outputting a haptic effect comprises outputting, by an air puff actuator, an air puff haptic effect.

19. A computer-readable non-transitory medium encoded with executable program code, the computer-readable medium comprising:

program code for detecting, by a proximity sensor, a non-contact interaction with a touch-sensitive device;

program code for detecting, by a touch sensor, a touch on the touch-sensitive device;

program code for transmitting a first sensor signal associated with the non-contact interaction to a processor;

program code for transmitting a second sensor signal associated with the touch to a processor;

program code for receiving, by the processor, the first and second sensor signals;

program code for generating, by the processor, a haptic output signal based at least in part on the first and second sensor signals; and program code for transmitting the haptic output signal to a haptic output device.

* * * * *